(12) United States Patent
Wang et al.

(10) Patent No.: US 11,080,189 B2
(45) Date of Patent: Aug. 3, 2021

(54) CPU-EFFICIENT CACHE REPLACMENT WITH TWO-PHASE EVICTION

(71) Applicant: VMware, Inc., Palo Alto, CA (US)

(72) Inventors: Wenguang Wang, Santa Clara, CA (US); Christoph Klee, Snoqualmie, WA (US); Adrian Drzewiecki, Cupertino, CA (US); Christos Karamanolis, Los Gatos, CA (US); Richard P. Spillane, Mountain View, CA (US); Maxime Austruy, Lausane (CH)

(73) Assignee: VMware, Inc., Palo Alto, CA (US)

( * ) Notice: Subject to any disclaimer, the term of this patent is extended or adjusted under 35 U.S.C. 154(b) by 94 days.

(21) Appl. No.: 16/256,726

(22) Filed: Jan. 24, 2019

(65) Prior Publication Data
US 2020/0242034 A1 Jul. 30, 2020

(51) Int. Cl.
*G06F 12/0815* (2016.01)
*G06F 12/1027* (2016.01)

(52) U.S. Cl.
CPC ...... *G06F 12/0815* (2013.01); *G06F 12/1027* (2013.01); *G06F 2212/608* (2013.01); *G06F 2212/684* (2013.01)

(58) Field of Classification Search
CPC ............. G06F 12/0815; G06F 12/1027; G06F 2212/608; G06F 2212/684
See application file for complete search history.

(56) References Cited

U.S. PATENT DOCUMENTS

| | | | |
|---|---|---|---|
| 6,446,187 B1 * | 9/2002 | Riedlinger | .......... G06F 12/1027 711/202 |
| 9,542,112 B2 | 1/2017 | Drzewiecki et al. | |
| 9,760,493 B1 | 9/2017 | Wang | |
| 2002/0032844 A1 | 3/2002 | West | |
| 2004/0107419 A1 | 6/2004 | Blackmore et al. | |
| 2008/0155183 A1 | 6/2008 | Zhuang et al. | |
| 2009/0210635 A1 | 8/2009 | Blackmore et al. | |
| 2012/0054445 A1 | 3/2012 | Swart et al. | |
| 2012/0054447 A1 | 3/2012 | Swart et al. | |

(Continued)

OTHER PUBLICATIONS

Johnson et al., "2Q: A Low Overhead High Performance Buffer Management Replacement Algorithm," Proceedings of the 20th VLDB Conference, Santiago, Chile, 1994, pp. 439-450.

(Continued)

*Primary Examiner* — Michelle T Bechtold
(74) *Attorney, Agent, or Firm* — Patterson + Sheridan, LLP (57) ABSTRACT

The present disclosure provides techniques for managing a cache of a computer system using a cache management data structure. The cache management data structure includes a cold queue, a ghost queue, and a hot queue. The techniques herein improve the functioning of the computer because management of the cache management data structure can be performed in parallel with multiple cores or multiple processors, because a sequential scan will only pollute (i.e., add unimportant memory pages) cold queue, and to an extent, ghost queue, but not hot queue, and also because the cache management data structure has lower memory requirements and lower CPU overhead on cache hit than some prior art algorithms.

18 Claims, 8 Drawing Sheets

(56) References Cited

U.S. PATENT DOCUMENTS

| | | | | |
|---|---|---|---|---|
| 2013/0124794 | A1* | 5/2013 | Bux | G06F 12/0246 |
| | | | | 711/103 |
| 2014/0149651 | A1* | 5/2014 | Forsyth | G06F 12/126 |
| | | | | 711/105 |
| 2015/0026412 | A1 | 1/2015 | Eads et al. | |
| 2017/0220482 | A1* | 8/2017 | Sivaprakasam | G06F 12/0862 |
| 2017/0262374 | A1* | 9/2017 | Wang | G06F 12/121 |

OTHER PUBLICATIONS

EunYoung Jeong et al.; "Scalable user-level tcp stack for multicore systems." mTCP http://shader.kaist.edu/mtcp/. Last updated Apr. 4, 2014.

Thomas K. "User space networking fuels nfv performance." https://software.intel.com/en-us/blogs/2015/06/12/user-spacenetworking-fuels-nfv-performance.

VFIO—virtual function i/o. https://www.kernel.org/doc/Documentation/vfio.txt.

Allan Bricker, Michel Gien, Marc Guillemont, Jim Lipkis, Douglas Orr, and Marc Rozier. A new look at microkernel-based unix operating systems: Lessons in performance and compatibility. In Proceedings of the EurOpen Spring 1991 Conference, Norway, Citeseer, 1991.

David Fiala, Frank Mueller, Christian Engelmann, Rolf Riesen, Kurt Ferreira, and Ron Brightwell. Detection and correction of silent data corruption for large-scale high-performance computing. In Proceedings of the International Conference on High Performance Computing, Networking, Storage and Analysis, SC '12, pp. 78:1-78:12, Los Alamitos, CA USA, 2012. IEEE Computer Society Press.

Bernd Panzer-Steindel. Data integrity. https://indico.cern.ch/event/13797/contributions/1362288/attachments/115080/163419/Data_integrity_v3.pdf, Apr. 2007.

Simon Peter, Jialin Li, Irene Zhang, Dan R. K. Ports, Doug Woos, Arvind Krishnamurthy, Thomas Anderson, and Timothy Roscoe. Arrakis: The operating system is the control plane. In 11th USENIX Symposium on Operating Systems Design and Implementation (OSDI 14), pp. 1-16, CO, Oct. 2014. USENIX Association.

* cited by examiner

CPU-EFFICIENT CACHE REPLACMENT WITH TWO-PHASE EVICTION

RELATED APPLICATIONS

This application is related to U.S. application Ser. No. 16/256,713 (Attorney Docket No. E256), titled "SYSTEM AND METHODS OF ZERO-COPY DATA PATH AMONG USER LEVEL PROCESSES," filed on the same day as the present application, the entire contents of which is hereby incorporated by reference herein.

BACKGROUND

Cache replacement techniques are used in computing devices that include a memory. In particular, cache replacement techniques are used to manage storage and eviction of data from the memory. The clock cache replacement algorithm is an improvement over cache replacement algorithms such as first-in-first-out (FIFO) and least recently used (LRU). The clock algorithm keeps a circular list of pages in memory, with each page located within a frame of the list. An iterator points to the frame that holds the last examined page in the list. When a page fault occurs (such as due to an access to a memory page not currently in the memory and instead stored in a storage device), and no empty frames exist to hold memory pages, then a bit is inspected at the frame pointed to by the iterator. The bit corresponds to a status of a memory page in a frame to which the iterator points. If the bit is zero, the memory page at that frame is evicted and a new page is loaded in place of the page to which the iterator points. If the bit is not zero, the bit is changed to zero, the clock iterator moves to the next frame, and the process repeats until a frame with a zero bit is reached.

However, the clock cache replacement algorithm does not work well during a sequential scan of data within storage. During a sequential scan, the clock algorithm may result in all important and popular memory pages being evicted from memory, while unimportant and unpopular memory pages are retained in memory. Various improvements have been made to the clock algorithm to address its various shortcomings. One example of an improvement is U.S. Pat. No. 9,760,493, entitled "System and Methods of a CPU-Efficient Cache Replacement Algorithm," issued Sep. 12, 2017, the entire contents of which are incorporated by reference herein.

What is desired is a clock cache technique that is scan friendly, has low central processing unit (CPU) overhead on cache hits, can take advantage of multi-core processing, and does not have a high memory usage.

SUMMARY

Embodiment provide a method of managing a cache of a computer system using a cache data structure that includes a cold queue, a ghost queue, and a hot queue, the hot queue configured as a ring buffer that includes a plurality of storage locations, wherein each of the storage locations has at least two bits associated with the storage location, the two bits indicating a status of contents within the storage location of the hot queue, the method comprising receiving a first input/output operation comprising a first location identifier of a first data item within the computer system; determining that the first location identifier is stored within the ghost queue of the cache data structure; upon determining that the first location identifier is stored within the ghost queue, (a) mapping the first location identifier to a first mapping data of the first data item, and (b) scanning the ring buffer of the hot queue, and for each storage location of the ring buffer scanned: (1) determining the value of the at least two bits of the storage location; (2) if the value of the least two bits indicates that the storage location is available for addition of new data, choosing the storage location; and adding the first location identifier and the first mapping data to the chosen storage location of the hot queue.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques for managing a cache of a computer system using a cache management data structure. The cache management data structure includes three queues, a cold queue, a ghost queue, and a hot queue, that work together to provide the advantages disclosed herein. The techniques of the present disclosure improve the functioning of the computer itself because management of the cache management data structure according to embodiments can be performed in parallel with multiple cores or multiple processors. In addition, a sequential scan will only add unimportant memory pages to cold queue, and to an extent, to ghost queue, but not to hot queue. Also, the cache management data structure according to embodiments has lower memory requirements and lower CPU overhead on cache hit than some of the prior art algorithms that are scan friendly.

In certain embodiments, the cold queue is a queue stored in memory that stores unimportant or less used memory pages than stored in the hot queue. In certain embodiments, the hot queue is a queue stored in memory that stores important or more frequently used memory pages than in the cold queue. In certain embodiments, the ghost queue is a queue stored in memory that stores memory pages evicted from the cold queue.

Figure 1A:
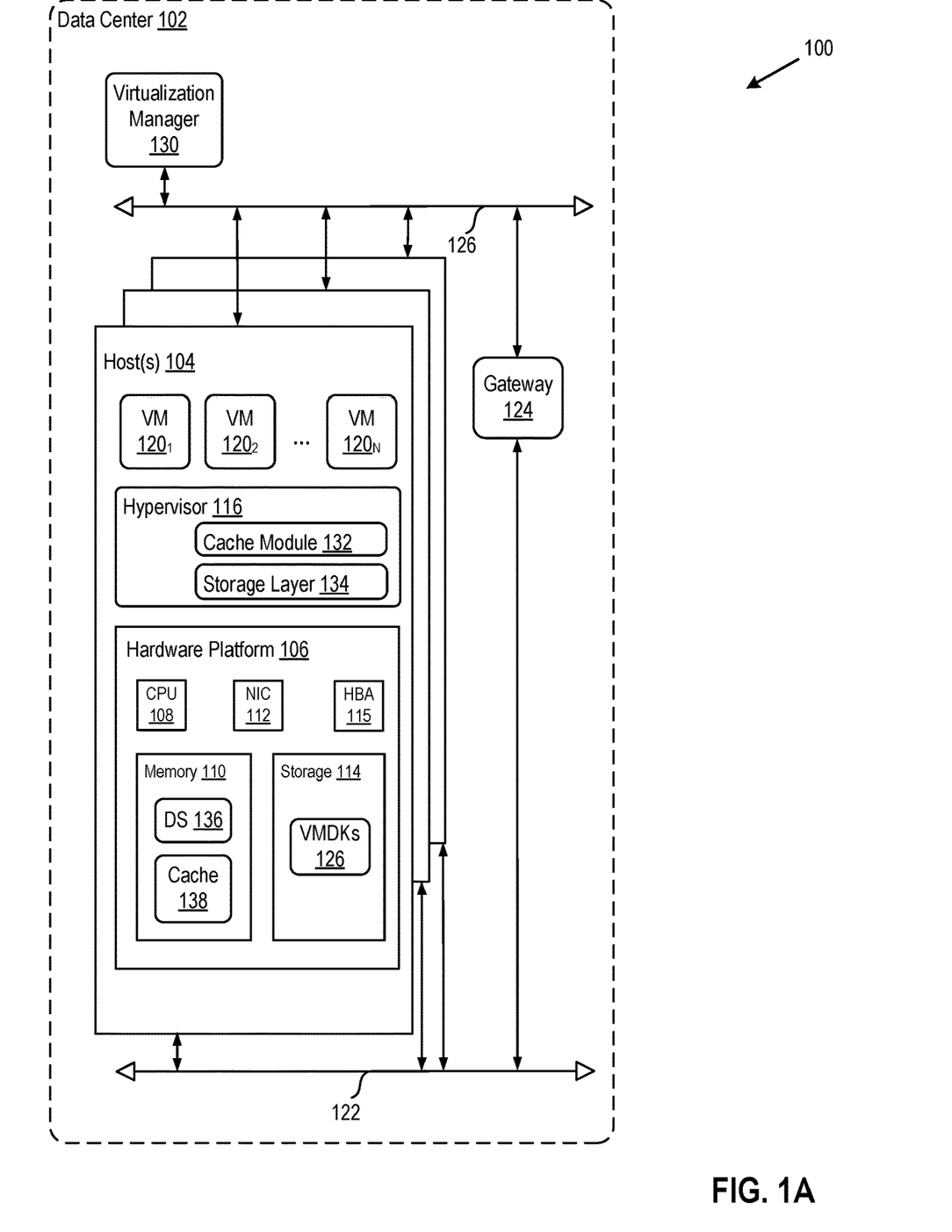
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Computer system 100 includes a data center 102. Data center 102 includes host(s) 104, a virtualization manager 130, a gateway 124, a management network 126, and a data network 122. Networks 122, 126, in one embodiment, each provide Layer 3 connectivity in accordance with the Open Systems Interconnection (OSI) model, with internal physical switches and routers not being shown. Although the management and data network are shown as separate physical networks, it is also possible in some implementations to logically isolate the management network from the data network, e.g., by using different VLAN identifiers. Each of hosts 104 may be constructed on a server grade hardware platform 106, such as an x86 architecture platform. For example, hosts 104 may be geographically co-located servers on the same rack.

Hardware platform 106 of each host 104 may include components of a computing device such as one or more processors (CPUs) 108, system memory 110, a network interface 112, storage system 114, a host bus adapter (HBA) 115, and other I/O devices such as, for example, USB interfaces (not shown). Network interface 112 enables host 104 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and the hosts 104 may be connected to each of the data network 122 and management network 126 via separate NICs or separate ports on the same MC. In certain embodiments, data network 122 and management network 126 may correspond to the same physical network, but different network segments, such as different VLAN segments.

Storage system 114 represents persistent storage devices (e.g., one or more hard disks, flash memory modules, solid state disks, and/or optical disks). Storage 114 may be internal to host 104, or may be external to host 104 and shared by a plurality of hosts 104, coupled via HBA 115 or MC 112, such as over a network. Storage 114 may be a storage area network (SAN) connected to host 104 by way of a distinct storage network (not shown) or via data network 122, e.g., when using iSCSI or FCoE storage protocols. Storage 114 may also be a network-attached storage (NAS) or another network data storage system, which may be accessible via MC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 includes a cache management data structure 136, further described below with reference to FIG. 2. Memory 110 also includes a cache 138 where data and metadata of the data are stored. Although cache 138 is shown as located within memory 110, cache 138 may be implemented in other components of computer system 100, such as in an external storage or memory device, shared by a plurality of hosts 104, and coupled to host 104 via HBA 115 or NIC 112.

Host 104 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 104. In some embodiments, hypervisor 116 can be installed as system level software directly on hardware platform 106 of host 104 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 104 without the use of a hypervisor and separate guest operating systems running on each.

During use, VMs 120 issue input-output operations (I/Os) to their respective virtual disks, which are provisioned in storage 114 as virtual machine disk files, shown as VMDKs 126. Hypervisor 116, through its "I/O stack" or "storage layer" 134, translates the I/Os sent from VMs 120 into I/Os that target one or more storage blocks representing the VMDK 126 corresponding to the virtual disk of the VM 120 issuing the I/O. Hypervisor 116 also includes a cache module 132 that employs a reserved area in system memory 110 to manage data structure 136 (see FIG. 2) so as to cache data of host 104, such as the read and write data associated with I/Os issued by VMs 120.

Virtualization manager 130 communicates with hosts 104 via a network, shown as a management network 126, and carries out administrative tasks for data center 102 such as managing hosts 104, managing VMs 120 running within each host 104, provisioning VMs, migrating VMs from one host to another host, and load balancing between hosts 104. Virtualization manager 130 may be a computer program that resides and executes in a central server in data center 102 or, alternatively, virtualization manager 130 may run as a virtual computing instance (e.g., a VM) in one of hosts 104. Although shown as a single unit, virtualization manager 130 may be implemented as a distributed or clustered system. That is, virtualization manager 130 may include multiple servers or virtual computing instances that implement management plane functions.

Gateway 124 provides VMs 120 and other components in data center 102 with connectivity to one or more networks used to communicate with one or more remote data centers. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 104. Gateway 124 may be a virtual appliance, a physical device, or a software module running within host 104.

Figure 1B:
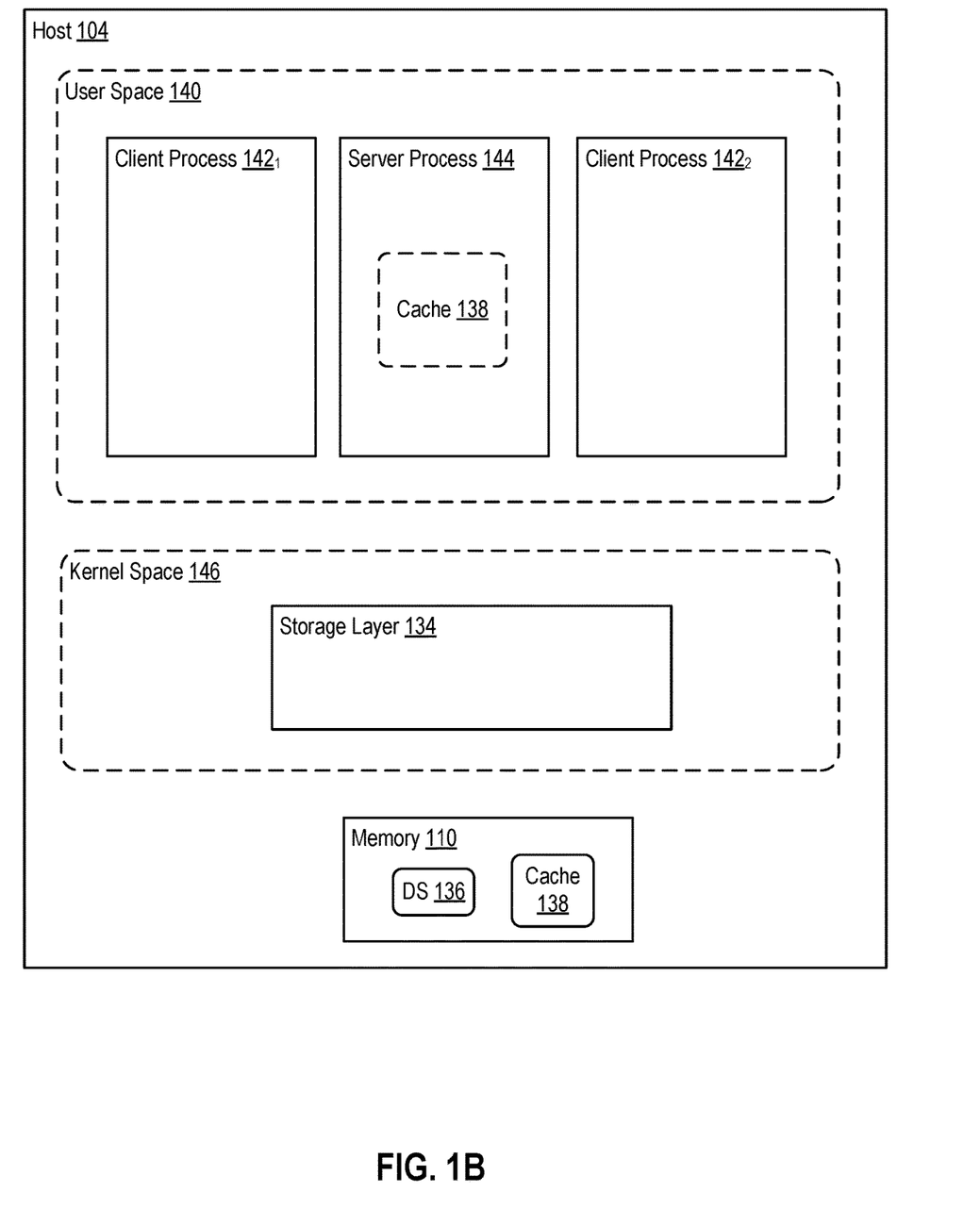
FIG. 1B depicts a block diagram of a host comprising a user space and a kernel space, according to an embodiment.

FIG. 1B depicts a block diagram of host 104 comprising user space 140 and kernel space 146 of host 104, according to an embodiment. Kernel space 146 comprises software components and address spaces of those components that are part of a privileged operating system (OS) kernel of host 104. The address spaces may be virtual or physical, and correspond to addresses in memory 110. As known in the art, virtual memory is an abstraction of physical memory that gives a process 142/144 the illusion of having large or infinite memory available. Virtual memory addresses are mapped to physical memory addresses by page tables stored in memory 110. The OS of host 104 is hypervisor 116. In embodiments, the OS may be a conventional desktop OS, like Microsoft Windows, Mac OS, or Linux.

Kernel space 146 includes the storage layer 134 that is configured to perform I/O with respect to storage 114. Kernel space 146 can include components that are not shown, such as a memory management subsystem, a process scheduling subsystem, privileged device drivers, etc.

User space 140 comprises a plurality of user processes, such as $142_1$, $142_2$, and 144 that run outside of the kernel. Examples of such user processes include application programs, shared libraries, virtual machines (VMs), etc. In an embodiment, rather than connecting to hardware of computer system 100 through storage layer 134, user processes 142/144 may connect to hardware of computer system 100 through single root input/output virtualization (SR-IOV) technology. Processes 142 and 144, as well as any kernel level processes, execute on the one or more processors 108.

Three user processes $142_1$, $142_2$, and 144 are shown, although any number of user processes may run concurrently. At least one of the user processes may be a server process 144, and one or more other processes may be client processes $142_1$ and $142_2$. Server process 144 comprises a cache, and that cache may be the cache 138, which is a portion of memory 110 corresponding to a portion of the virtual or physical memory address space of server process 144, as shown by the dotted lines of cache 138 within server process 144, and by the solid lines of cache 138 within memory 110. It may be advantageous for server process 144 to perform I/O operations for client process 142, because performing I/O operations centrally allows for running of central algorithms, which are easier to create and are less error prone.

In order for client process 142 to perform an I/O operation on storage 114 through server process 144, server process 144 needs to be able to obtain data from client process 142 and/or to be able to provide data to client process 142. One way for server process 144 to obtain data from client process 142 is to map a portion of virtual address space of client process 142 into the virtual address space of server process 144. The mapping of a portion of server process 144 virtual address space to a portion of a client process 142 virtual address space may be accomplished, for example, by mapping each virtual address in the portion of the server process 144 to a page table, that page table being the same page table to which virtual addresses of client process 142 point. Mapping a virtual address of a first process to a virtual address of another process, in effect creates a shared memory and allows the first process to access and modify data of the other process by referencing the address space of the first process. One method of performing such a mapping is described in U.S. application Ser. No. 16/256,713, titled "SYSTEM AND METHODS OF ZERO-COPY DATA PATH AMONG USER LEVEL PROCESSES," incorporated by reference above.

Figure 2:
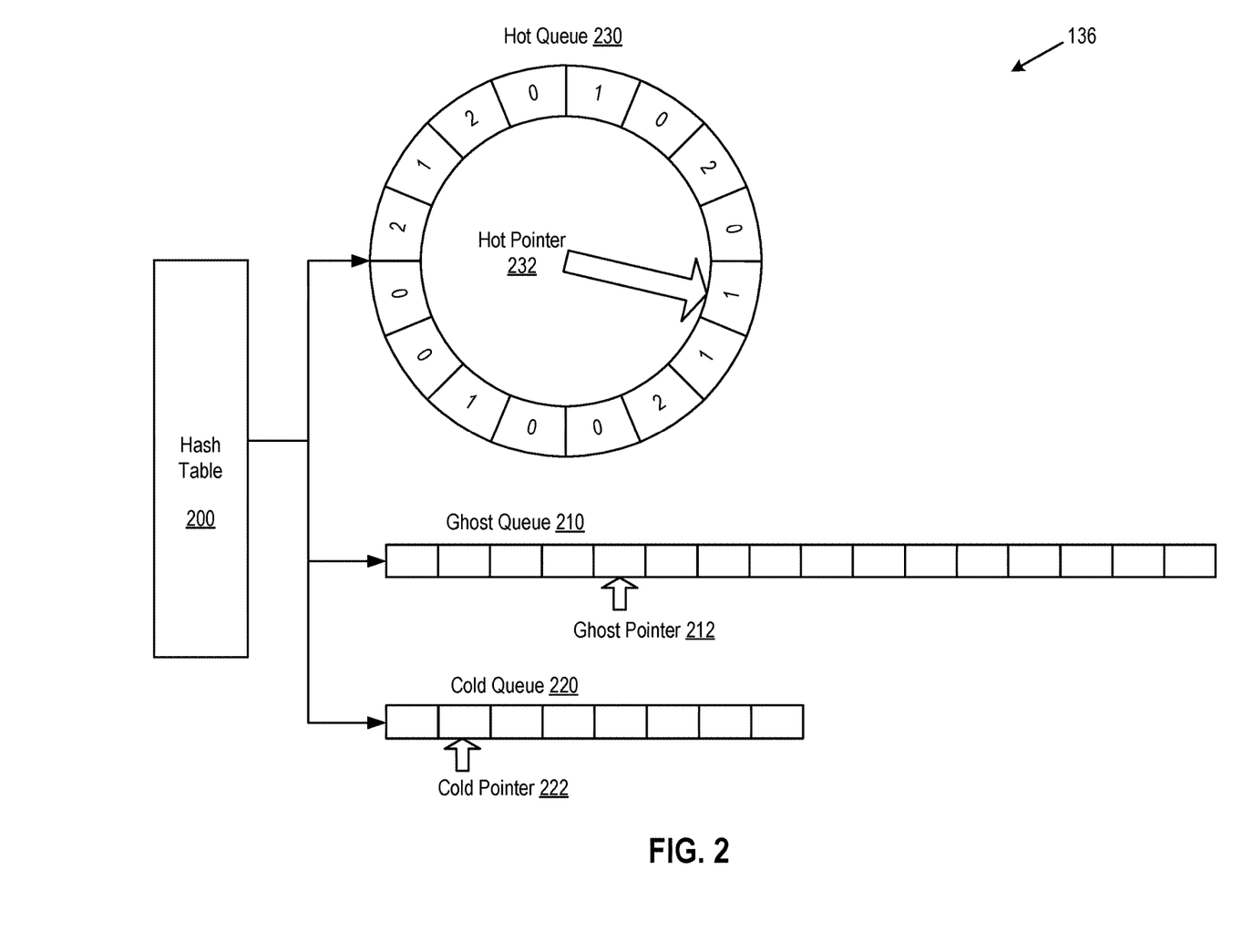
FIG. 2 depicts a block diagram of an exemplary cache management data structure, according to embodiments.

FIG. 2 depicts a block diagram of an exemplary cache management data structure 136, according to embodiments. Cache data structure 136 includes a hash table 200, a ghost queue 210, a cold queue 220, and a hot queue 230.

Hash table 200 includes entries that are indexed according to a hash of a location identifier, or in some embodiments, just the location identifier. Each entry of hash table 200 includes (1) a hash of a location identifier whose contents are currently cached within cache 138 or currently mapped as described below, and (2) a pointer to a storage location in one of queues 210/220/230 that stores the location identifier.

The location identifier may differ depending on application. For example, for the application of caching I/Os directed to storage 114, the location identifier may include a logical block address (LBA) representing the target location for an issued I/O, such as an I/O to storage 114. For the application of mapping a virtual address of a first process active in CPU 108, such as process 144, to a virtual address of a second process, such as process 142, the location identifier may include the virtual address of the second process. The location identifier may map the first process to a page table of a virtual address space of the second process. For the application of mapping a region of a virtual address space of a first process to a region of virtual address space of a second process, the location identifier may include a pair consisting of (a) an offset within the virtual address space of the second process, and (b) a process ID of the second process. A location identifier may also be a hash value or a memory page number.

Queues 210, 220, and 230 of cache management data structure 136 are described below with reference to FIGS. 3-7.

Figure 3:
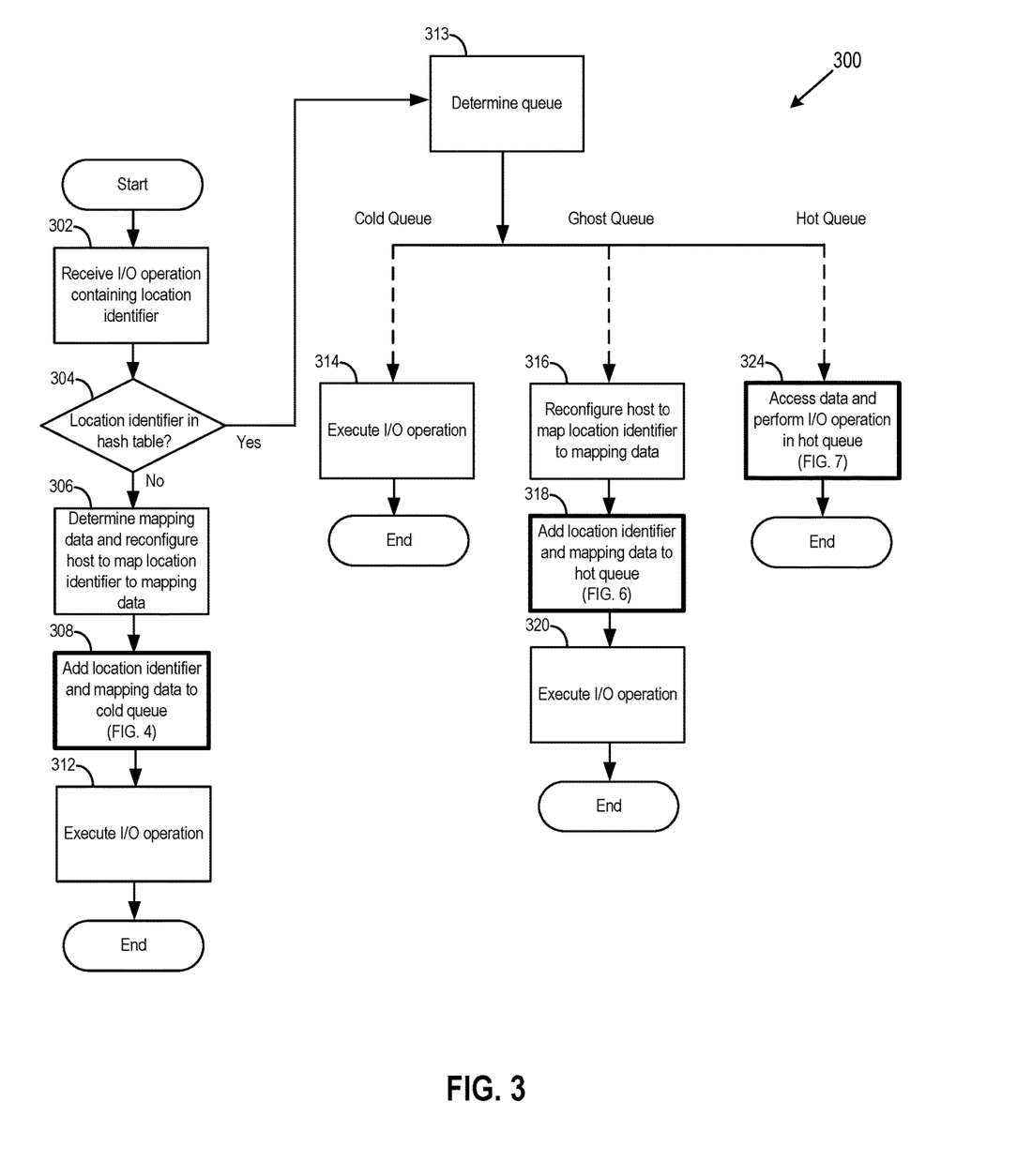
FIG. 3 depicts a flow diagram of a method of managing a cache data structure in response to an input/output operation within a computer system, according to an embodiment.

FIG. 3 depicts a flow diagram of a method 300 of managing cache data structure 136 in response to an I/O operation within computer system 100, according to an embodiment. At block 302, cache module 132 receives an I/O operation. The I/O operation includes a location identifier to a data item, as described above. The I/O operation is an operation that attempts to access data, and the data might be stored within cache 138. The I/O operation may be, for example, a read operation or a write operation. The I/O operation may be sent, for example, by one of VMs 120.

Optionally, prior to block 302, the I/O operation may be sent by client process 142 to server process 144, so that server process 144 may perform the I/O operation on behalf of client process 142. Upon receiving the I/O operation, server process 144 may modify the I/O location identifier to be specific to the address space of server process 144. Then, server process 144 may send the modified I/O operation to cache module 132 as part of block 302.

At block 304, cache module 132 determines whether a hash of the location identifier is present within hash table 200. Presence of a hash of the location identifier within hash table 200 indicates that the location identifier is stored within one of queues 210, 220, or 230, and that data associated with the location identifier is within cache 138 (or was recently within cache 138 if the location identifier is in ghost queue 210). If a hash of the location identifier is not in hash table 200, then method 300 proceeds to block 306. If a hash of the location identifier is in hash table 200, then method 300 proceeds to block 313.

At block 306, host 104 is reconfigured to map the location identifier to mapping data. "Mapping data" or "mapping data of the location identifier" is determined by the OS of host 104, such as by hypervisor 116, as described below. Reconfiguring host 104 may be initiated by a command from cache module 132 to the OS of host 104, such as to hypervisor 116.

"Mapping data" may differ depending on application. For example, for the application of caching I/Os directed to storage 114, mapping data may include a pointer (e.g., virtual or physical address) to a memory page in cache 138 where the data of the location identifier (e.g., LBA) is cached. For the application of mapping a virtual address of a first process to a virtual address of a second process, the mapping data may include a pointer to a memory page to which the location identifier (virtual address of the second process) points. For the application of mapping a region of a virtual address space of a first process to an region of a virtual address space of a second process, mapping data may include an offset within the virtual address space of the first process, that offset being mappable to the location identifier (a pair consisting of (a) an offset within the virtual address space of the second process, and (b) a process ID of the second process). Optionally, mapping data may include a size indicator of the regions that are being mapped. The two regions being mapped may be of equal size. Mapping data may be metadata describing aspects of the data that is to be accessed by the I/O operation received at block 302.

As further explained below, each storage location of cold queue 220 and hot queue 230 includes both a location identifier and mapping data, while each storage location of ghost queue 210 includes a location identifier, but not mapping data.

As part of block 306, host 104 is reconfigured to map the location identifier to mapping data. The reconfiguration depends on application. For example, for the application of caching I/Os directed to storage 114, the change in configuration is the loading of a memory page from storage 114 into cache 138 of memory 110, and mapping a storage location of data structure 136 to that memory page by adding to the storage location of data structure 136 a pointer pointing to the newly loaded memory page. For the application of mapping a virtual address of a first process to a virtual address of a second process, the change in configuration is the mapping of (a) the memory page pointed to by the virtual address of the first process, to (b) the virtual address of the second process. Reconfiguration of a virtual address to resolve to a different page table results in the virtual address of the first process resolving to a different memory page within host 104 and in a different memory page being loaded within cache 138. For the application of mapping a region of a virtual address space of a first process to a region of virtual address space of a second process, the change in configuration is the mapping of each virtual address in the region of the first process to the page table that is used by addresses in the region of the second process.

At block 308, cache module 132 adds the location identifier and mapping data to cold queue 220. Block 308 is expanded in FIG. 4, and described in detail by method 400 of FIG. 4.

Figure 4:
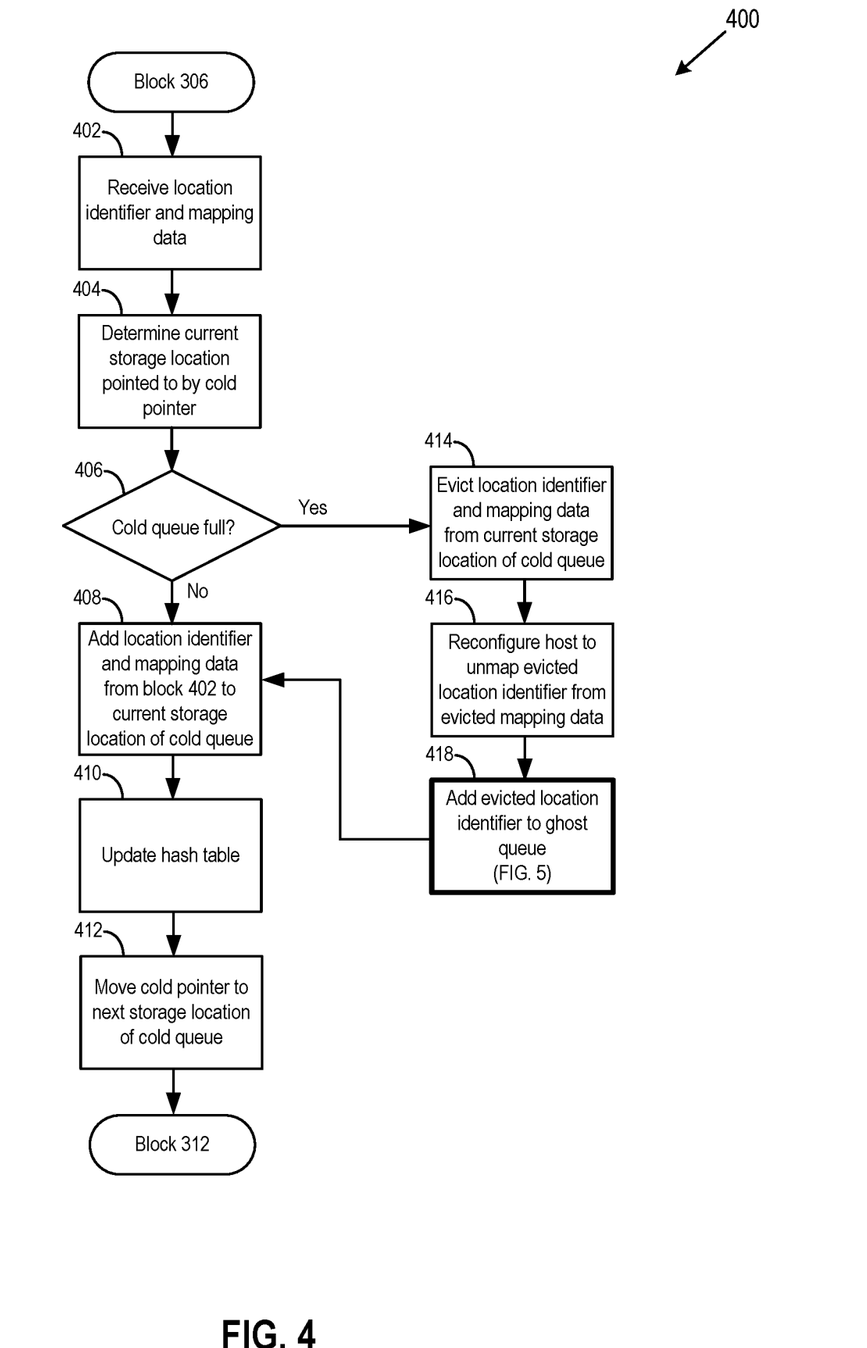
FIG. 4 depicts a flow diagram of a method of adding data to the cold queue, according to an embodiment.

FIG. 4 depicts a flow diagram of a method 400 of adding data to cold queue 220, according to an embodiment. When data first enters data structure 136, it enters into a storage location within cold queue 220. Cold queue 220 uses a FIFO replacement algorithm. The FIFO algorithm is implemented via a cold pointer 222 (see FIG. 2). When old data stored at the storage location pointed to by cold pointer 222 is evicted, new data is added to that storage location, and cold pointer 222 shifts to the next storage location. Accessing data within cold queue 220 for an I/O operation does not affect that data with regards to the FIFO replacement algorithm. When data is evicted from cold queue 220 by the FIFO algorithm, a portion but not all of that data is added into ghost queue 210, as described with respect to FIG. 5, and that portion is the location identifier. The data that is not carried over from cold queue 220 into ghost queue 210 is the mapping data of the location identifier. In an embodiment, cold queue 220 is approximately one-third the size of hot queue 230. In an embodiment, cold queue 220 is approximately equal in size to ghost queue 210.

At block 402, cache module 132 receives a location identifier and mapping data that is to be added to cold queue 220. Block 402 may be performed by, for example, executing blocks 302 and 306 of method 300.

At block 404, cache module 132 determines the storage location within cold queue 220 pointed to by cold pointer 222. Cache module 132 stores this storage location as the current storage location of cold queue 220.

At block 406, cache module 132 determines whether cold queue 220 is full. If not full, method 400 continues to block 408. If cold queue 220 is full, method 400 continues to block 414.

At block 408, cache module 132 adds the location identifier and mapping data received at block 402 to the current storage location of cold queue 220.

At block 410, cache module 132 updates hash table 200 to reflect the presence of new data within data structure 136. Cache module 132 adds a hash of the location identifier, which was added to cold queue 220 at block 408, to hash table 200. Cache module 132 also adds a pointer within hash table 200, the pointer pointing to the current storage location within cold queue 220 containing the location identifier whose hash has been added. Cache module 132 associates the newly added hash of the location identifier with the newly added pointer to the current storage location of cold queue 220.

At block 412, cache module 132 shifts cold pointer 222 to the next storage location of cold queue 220. From block 412, method 400 returns to block 310 of method 300.

At block 414, which is reached if cold queue 220 is full, cache module 132 evicts the data stored at the current storage location of cold queue 220. As part of the eviction, cache module moves the location identifier to ghost queue 210, as described in block 418.

At block 416, host 104 is reconfigured to unmap the location identifier from the mapping data. Block 406 is essentially the reverse of block 306, and also includes clearing the table lookaside buffers (TLBs) of the process that is currently executing on CPU 108. The entire TLB may be cleared, or only a portion or entry of the TLB containing the mapping between the location identifier and the mapping data may be cleared.

Figure 6:
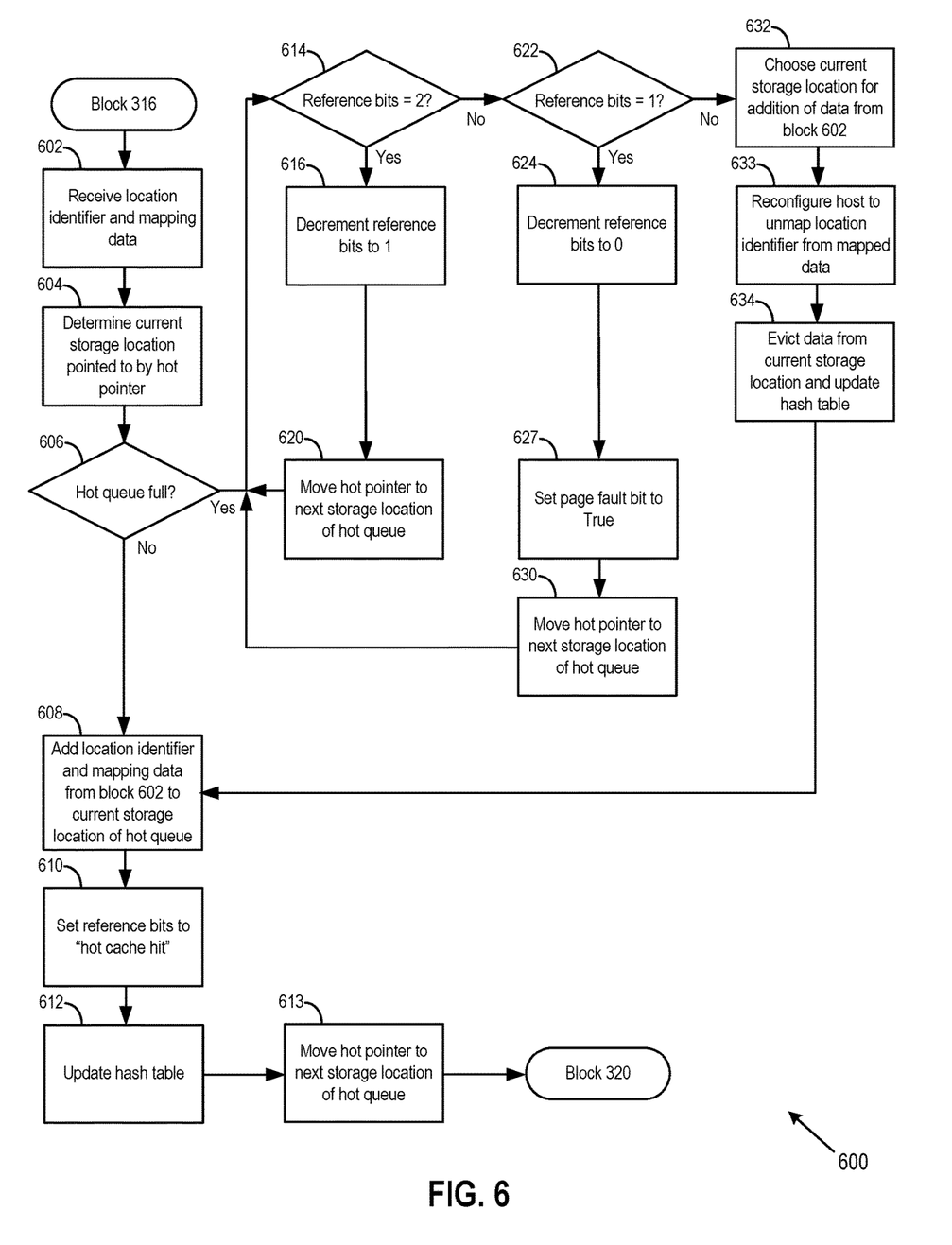
FIG. 6 depicts a flow diagram of a method of adding data to the hot queue, according to an embodiment.

In an embodiment, multiple TLBs may exist on host 104, such as a TLB within memory 110 and a second TLB within CPU 108. As used herein in, clearing the TLB means clearing each TLB that contains one or more entries that contain a mapping between the location identifier and mapping data that is being unmapped at block 416. The unmapping of a location identifier from mapping data, together with clearing all applicable TLBs, is considered a "full unmap.". In an embodiment, a "full unmap" may also include sending a command by cache module 132 to hypervisor 116 to locate a page table entry pointing to the memory page to which the location identifier maps, and (a) clearing, deleting, or unreserving that page table entry, and optionally (b) setting a "page fault bit" to TRUE in that page table entry. Setting a page fault bit to TRUE in a page table entry indicates that the memory page to which the page table entry points is not in memory and needs to be retrieved from a storage location. If a location identifier resolves to a page table entry whose page fault bit is set to TRUE, then a page fault occurs.

The details of the unmapping that is performed at block 416 depend on application. For example, for the application of caching I/Os directed to storage 114, the unmapping includes clearing or deleting a memory page from the cache 138 of memory 110, and marking the page table entry pertaining to that memory page as NULL. For the application of mapping a virtual address of a first process to a virtual address of a second process, the change in configuration may be the unmapping of the virtual address of the first process from its current page table, such as by making a proper unmap system call and/or by setting a page table entry to which the virtual address of the first process resolves to NULL. For the application of mapping a region of a virtual address space of a first process to an region of virtual address space of a second process, the unmapping is the unmapping of each virtual address in the region of the first process from the page table that is used by addresses in the region of the second process.

At block 418, cache module 132 adds the location identifier that was evicted at block 414 to ghost queue 210. Block 418 is expanded in FIG. 5, and described in detail by method 500 of FIG. 5.

Figure 5:
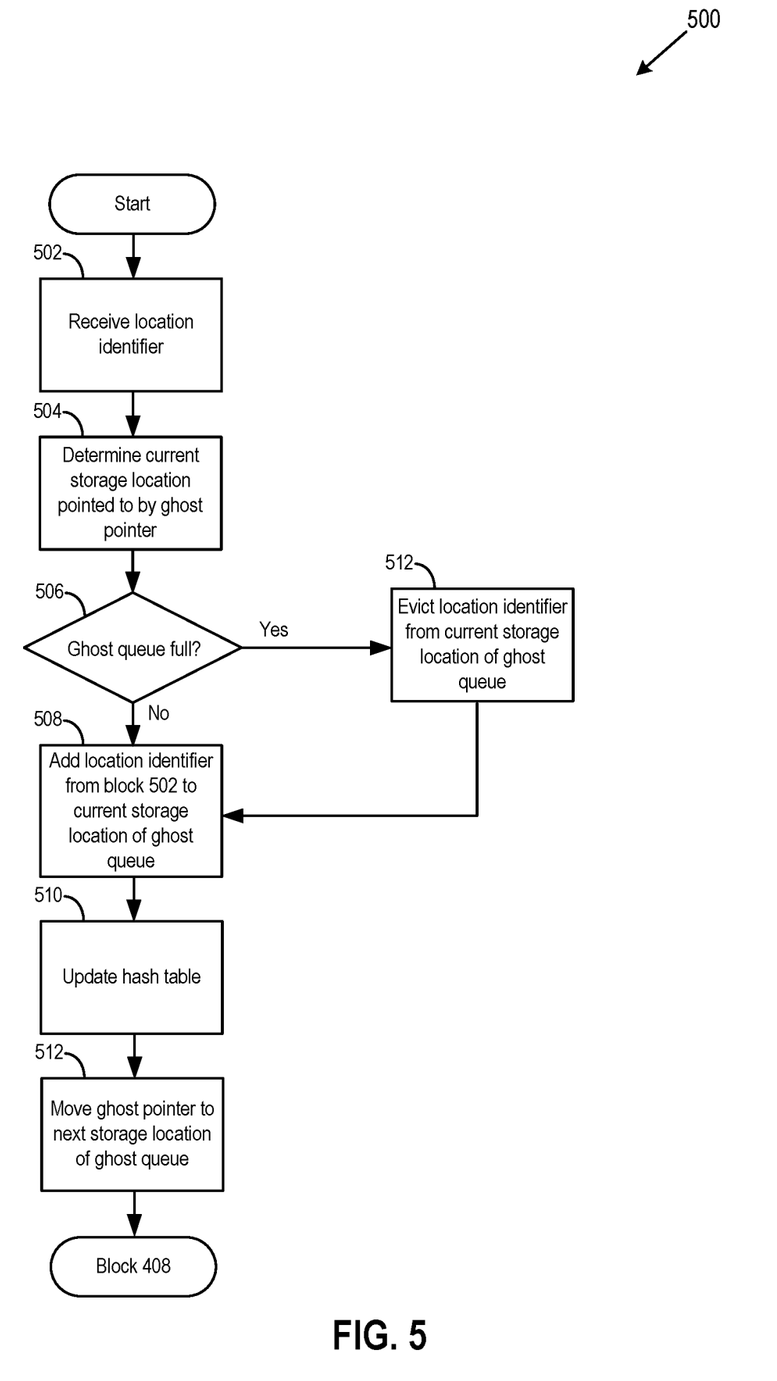
FIG. 5 depicts a flow diagram of a method of adding data to the ghost queue, according to an embodiment.

FIG. 5 depicts a flow diagram of a method 500 of adding data to ghost queue 210, according to an embodiment. A location identifier is added to ghost queue 210 from cold queue 220. In an embodiment, a location identifier can only be added to ghost queue 210 from cold queue 220. Ghost queue 210 uses a FIFO replacement algorithm. The FIFO algorithm is implemented via a ghost pointer 212 (see FIG. 2). When old data stored at the storage location pointed to by ghost pointer 212 is evicted by the FIFO algorithm, that data is deleted and not added to any other queue in data structure 136. Accessing data within ghost queue 210 for an I/O operation affects that data with regards to the FIFO replacement algorithm in that, when data within ghost queue 210 is accessed for the I/O operation, the data is evicted and also moved into hot queue 230. The data (i.e., location identifier) that is copied into hot queue 230 is then remapped anew within computer system 100, and new mapping data is created and added into the storage location of hot queue 230, as described with reference to FIG. 6, below.

At block 502, cache module 132 receives a location identifier that is to be added to ghost queue 210. Block 502 may be performed by, for example, executing block 414 of method 400.

At block 504, cache module 132 determines the storage location within ghost queue 210 pointed to by ghost pointer 212. Cache module 132 stores this storage location as the current storage location of ghost queue 210.

At block 506, cache module 132 determines whether ghost queue 210 is full. If not full, method 500 continues to block 508. If ghost queue 210 is full, method 500 continues to block 512.

At block 512, which is reached if ghost queue 210 is full, cache module 132 evicts data from the current storage location of ghost queue 210 so as to free a storage location for the addition of location identifier of block 502. From block 512, method 500 continues to block 508.

At block 508, cache module 132 adds the location identifier from block 502 to the current storage location of ghost queue 210.

At block 510, cache module 132 updates hash table 200 to reflect the presence of the location identifier in the ghost queue, rather than in the cold queue. Cache module 132 modifies the pointer that is associated with the location identifier within hash table 200 so that the pointer points to the current storage location of ghost queue 210 rather than to the storage location of cold queue 220 from which data was evicted in block 414. The update to hash table 200 of block 510 may be performed as part of block 410 of method 400 rather than as part of method 500.

At block 512, cache module 132 shifts ghost pointer 212 to the next storage location of ghost queue 210. After block 512, method 500 returns to block 408 of method 400.

Returning to FIG. 4, after block 512, blocks 408 through 412 of method 400 are repeated. Blocks 408 through 412 are described above. From block 412, method 400 returns to block 312 of method 300.

Returning to FIG. 3, after location identifier and mapping data are added to cold queue 220, at block 312, the I/O operation received at block 302 is executed. The I/O operation may be executed, for example, by hypervisor 116 of host 104. Block 312 may include returning data from a memory page associated with the location identifier of block 302, if the I/O operation is a read operation. Block 312 may include modifying data stored at a memory page associated with the location identifier of block 302, if the I/O operation is a write operation. After block 312, method 300 ends.

Returning to block 304 of method 300, if a hash of the location identifier received at block 302 is within hash table 200, then the data associated with the location identifier is already tracked by data structure 136, and that location identifier does not need to be added to data structure 136. The location identifier of block 302 is already within one of the queues of data structure 136.

At block 313, cache module 132 accesses the pointer within hash table 200, the pointer associated with the location identifier, so as to obtain the storage location within one of queues 210, 220, or 230 where the location identifier is stored. This is the storage location that is the target of the I/O operation received at block 302. From block 313, method 300 continues to one of blocks 314, 316, or 324, depending on which queue stores the location identifier. If the pointer points to a storage location within cold queue 220, then method 300 continues to block 314. If the pointer points to a storage location within ghost queue 210, then method 300 continues to block 316. If the pointer points to a storage location within hot queue 230, then method 300 continues to block 324.

At block 314, which is reached if the location identifier of the I/O operation received at block 302 is within cold queue 220, the I/O operation is executed. Accessing data that is tracked by cold queue 220 does not affect the arrangement of information within data structure 136. Block 314 includes substantially the same steps as block 312.

At block 316, which is reached if the location identifier of the I/O operation received at block 302 is within ghost queue 220, host 104 is reconfigured to map the location identifier received at block 302 to mapping data, in preparation for moving that location identifier to hot queue 230 at block 318 of method 300. Block 316 includes substantially the same steps as block 306. Also as part of block 316, data (i.e., location identifier) is evicted from location of ghost queue 210 in which the location identifier received at block 302 is located.

At block 318, cache module 132 adds the location identifier and mapping data (from block 316) to hot queue 220. Block 318 is expanded in FIG. 6, and described in detail by method 600 of FIG. 6.

FIG. 6 depicts a flow diagram of a method 600 of adding data to hot queue 230, according to an embodiment. A location identifier is added to hot queue 230 from ghost queue 210. In an embodiment, a location identifier can only be added to hot queue 230 from ghost queue 210. Hot queue 230 is configured as a ring buffer that includes a plurality of storage locations that are accessed in a circular manner using a hot pointer 232. Each storage location of hot queue 230 has two reference bits associated therewith. The two reference bits can represent up to four values, but within hot queue 230, only three values are used to track the status of data within each storage location. Those values may be, for example, 2 ("10" in binary) representing a "hot cache hit," 1 ("01" in binary) representing a "warm cache hit," and 0 ("00" in binary) representing a "half unmap." These exemplary values are shown in hot queue 230 within FIG. 2.

A "hot cache hit" storage location status within hot queue 230 indicates that a page fault bit within a page table entry pointing to the memory page to which the location identifier resolves is set to FALSE, that the location identifier is actually mapped to the mapping data within host 104, that memory 110 contains the memory page to which the location identifier resolves, and that one or more TLBs within computer system 100 store the mapping information of location identifier being mapped to the mapping data. A hot cache hit status of a storage location indicates that data within that storage location has likely been accessed more recently than data within a storage location that has a "warm cache hit" status.

A "warm cache hit" status of a storage location is similar to a hot cache hit status, except that the reference bits of that storage location indicate that data within a "warm cache hit" storage location has likely been accessed less recently than data of a "hot cache hit" status. Changing the status from a hot cache hit to a warm cache hit of a storage location of data structure 136 may be performed by, for example, decrementing the reference bits of that storage location from a 2 to a 1.

A "half unmap" storage location status within hot queue 230 indicates that a page fault bit within a page table entry pointing to the memory page to which the location identifier resolves is set to TRUE, but that the location identifier is still actually mapped to the mapping data within host 104. That is, memory 110 still contains the memory page to which the location identifier resolves. Also, TLBs within computer system 100 store the mapping information of location identifier being mapped to the mapping data. When hypervisor 116 attempts to access a memory page to which the location identifier resolves, a page fault will occur. Hypervisor 116 and/or CPU 108 will access a TLB stored within memory 110 or within CPU 108, obtain the mapping information, set the page fault bit to FALSE, and perform the I/O operation without needing to load a memory page into memory 110 from another location. Setting a page fault bit to FALSE in a page table entry indicates that the memory page to which the page table entry points is in memory and does not need to be retrieved from a storage location. If a location identifier resolves to a page table entry whose page fault bit is set to FALSE, then a page fault does not occur.

A "half unmap" status may be compared to a "full unmap" status. A full unmap is a transitory status that exists after data is evicted from a storage location of data structure 136 and before new data is added. Because a full unmap status is transitory, reference bits within a storage location do not indicate when this status is active. A full unmap occurs when a location identifier is unmapped from mapping data within host 104, that information regarding the mapping does not exist in any TLBs within computer system 100, and optionally that a page fault bit—within a page table entry that points to or would point to the memory page to which the location identifier resolves—is set to TRUE. A full unmap is described below with reference to block 633 of FIG. 6.

At block 602, cache module 132 receives a location identifier and mapping data that is to be added to hot queue 230. The location identifier and mapping data for block 602 may be obtained, for example, from execution of blocks 302 and 306 of method 300.

At block 604, cache module 132 determines the storage location within hot queue 230 pointed to by hot pointer 232. Cache module 132 stores this storage location as the current storage location of hot queue 230.

At block 606, cache module 132 determines whether hot queue 230 is full. If not full, method 600 continues to block 608. If hot queue 230 is full, method 600 continues to block 614.

At block 608, cache module 132 adds the location identifier and mapping data received at block 602 to the current storage location of hot queue 230.

At block 610, cache module 132 sets the reference bits of the current storage location of hot queue 230 to a "hot cache hit," such as by setting the reference bits to the value 2.

At block 612, cache module 132 updates hash table 200 to reflect the new storage location of the location identifier within hot queue 230 rather than in ghost queue 210. Cache module 132 modifies the pointer that is associated with the location identifier within hash table 200 so that the pointer points to the current storage location of hot queue 230 rather than to the storage location of ghost queue 210 from which data was evicted in block 316.

At block 613, cache module 132 shifts hot pointer 232 to the next storage location of hot queue 230. From block 613, method 600 returns to block 320 of method 300.

At block 614, which is reached if hot queue 230 is full, cache module 132 begins to cycle through hot queue 230 until cache module 132 finds a storage location whose status is "half unmap," indicating that the storage location may be used for addition of new data (i.e., for addition of location identifier and mapping data). Although blocks 614, 622, and 632 are arranged such that the reference bits are checked for potential values in descending order, the value of the reference bits may be checked in any order.

At block 614, cache module 132 determines whether the status of the current storage location is a "hot cache hit," which may be indicated by a value of 2 stored by the reference bits of the current storage location. If so, then method 600 continues to block 616. Otherwise, method 600 continues to block 622.

At block 616, cache module 132 changes the status of the current storage location from "hot cache hit" to "warm cache hit," such as by decrementing the value stored by the reference bits to a 1.

At block 620, cache module 132 shifts hot pointer 232 to the next storage location of hot queue 230. From block 620, method 600 returns to block 614 to check status of that new current storage location.

At block 622, cache module 132 determines whether the status of the current storage location is "warm cache hit," which may be indicated by a value of 1 stored by the reference bits of the current storage location. If so, then method 600 continues to block 624. Otherwise, method 600 continues to block 632.

At block 624, cache module 132 changes the status of the current storage location from "warm cache hit" to "half unmap," such as by decrementing the value stored by the reference bits to a 0.

At block 627, cache module 132 sends a call to hypervisor 116 to set the page fault bit of a page table entry to TRUE, that page table entry being the entry that points to a memory page to which the location identifier of the current storage location resolves. As part of block 627, hypervisor 116 sets that page fault bit to TRUE.

At block 630, cache module 132 shifts hot pointer 232 to the next storage location of hot queue 230. From block 630, method 600 returns to block 614 to check status of that new current storage location.

At block 632, which is reached if the status of the current storage location is "half unmap," cache module 132 chooses the current storage location for addition of location identifier and mapping data that were received at block 602. Optionally, as part of block 632, caching module may check whether the status of the current storage location is "half unmap," and if not, caching module may return an Error.

At block 633, host 104 is reconfigured to unmap the location identifier from the mapping data. Block 633 includes substantially the same steps as block 416 of method 400 of FIG. 4.

At block 634, cache module 132 evicts the location identifier and mapping data from the current storage location of hot queue. Cache module 132 also updates hash table 200 to remove the hash of the location identifier so as to reflect the absence of the location identifier in data structure 136. From block 634, method 600 continues to block 608, which is described above, and blocks 608-613 are executed. After block 613, method 600 returns to block 320 of FIG. 3.

At block 320 the I/O operation received at block 302 is executed. Block 320 includes substantially the same steps as block 312. After block 320, method 300 ends.

At block 324, which is reached if the location identifier of the I/O operation received at block 302 is within hot queue 230, data of hot queue 230 is accessed to perform the I/O operation. Block 324 is expanded in FIG. 7, and described in detail by method 700 of FIG. 7.

Figure 7:
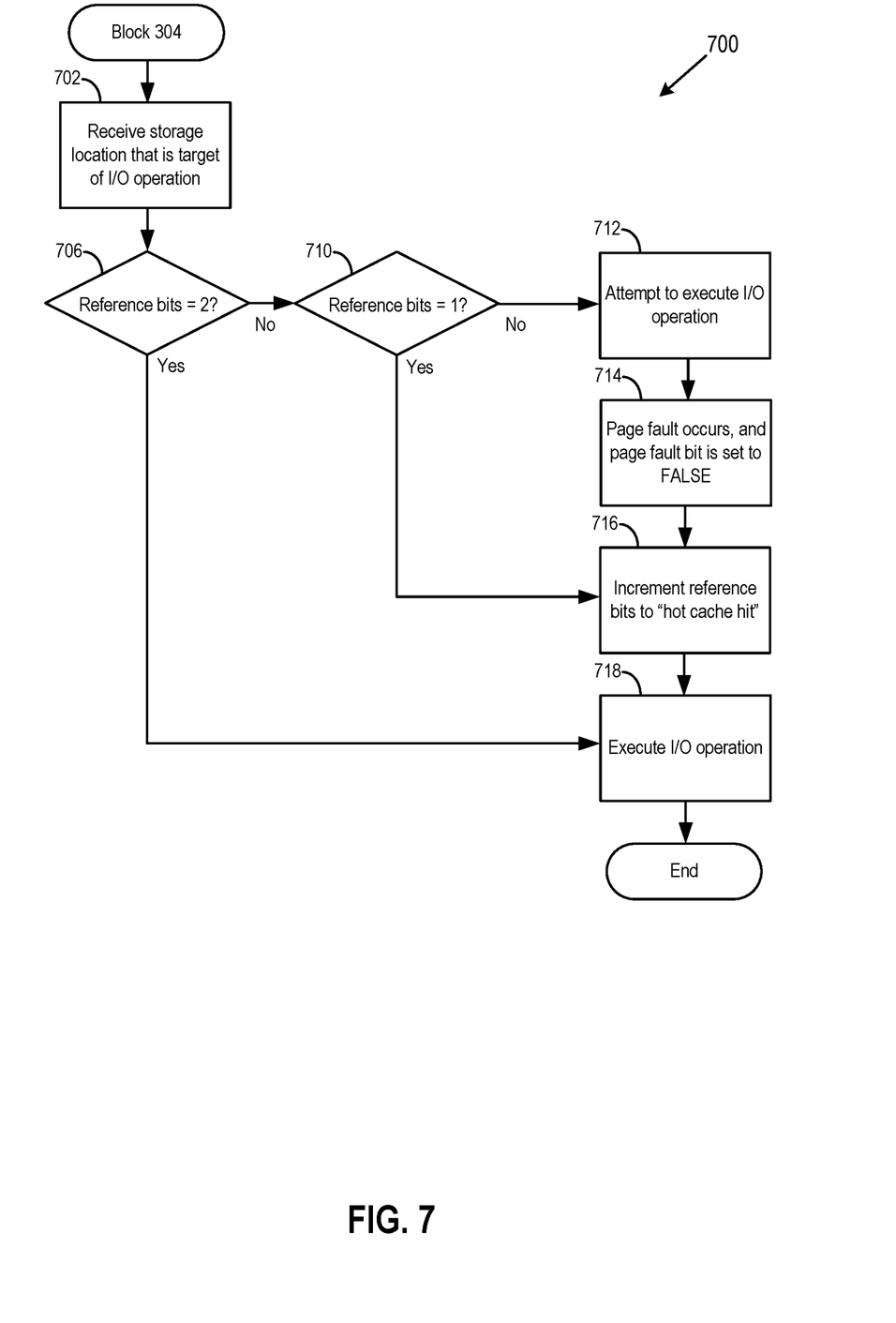
FIG. 7 depicts a flow diagram of a method of accessing data within the hot queue so as to perform the received operation, according to an embodiment.

FIG. 7 depicts a flow diagram of a method 700 of accessing data within hot queue 230 so as to perform the received I/O operation, according to an embodiment. At block 702, cache module 132 receives the address of the storage location within hot queue 230 that is the target of the I/O operation received at block 302. The storage location that is the target of the I/O operation ("target storage location") may be obtained, for example, from execution of block 313 of method 300.

At block 706, cache module 132 determines whether the status of the target storage location is a "hot cache hit," which may be indicated by a value of 2 stored by the reference bits of the target storage location. If so, then method 700 continues to block 718, where the I/O operation is executed substantially the same as the steps of block 312. After block 718, method 700 ends. If the status of the target storage location at block 706 is not a "hot cache hit," then method 700 continues to block 710.

At block 710, cache module 132 determines whether the status of the target storage location is a "warm cache hit," which may be indicated by a value of 1 stored by the reference bits of the target storage location. If so, then method 700 continues to block 716. Otherwise, method 700 continues to block 712.

At block 716, as a result of an access to target data of the target storage location, hypervisor 116 increments the reference bits of the target storage location to a hot cache hit, which may be, for example, a value of 2. After block 716, method 700 continues to block 718, which is described above.

At block 712, hypervisor 116 attempts to execute the I/O operation received at block 302. When resolving the location identifier to a page table entry that is supposed to point to a memory page containing target data, hypervisor 116 determines that the page table entry has its page fault bit set to TRUE.

At block 714, hypervisor 116 initiates a page fault to load the target data into a memory page within memory 110. Hypervisor 116 and/or CPU 108 checks a TLB for the presence of mapping information between the location identifier and mapping data that are stored in the target storage location of hot queue 230. The mapping information is successfully located and the hypervisor 116 or CPU 108 obtains the page table entry that maps to the memory page containing target data that is to be used for execution of the I/O operation. Hypervisor 116 or CPU 108 accesses the obtained page table entry, sets the page fault bit to FALSE, and accesses the target data within the memory page pointed to by the page table entry. After block 714, blocks 716 and 718 are performed as described above. After block 718, method 700 ends, which also ends method 300 of FIG. 3.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing a cache of a computer system using a cache data structure that includes a cold queue, a ghost queue, and a hot queue, the hot queue configured as a ring buffer that includes a plurality of storage locations, wherein each of the storage locations has at least two bits associated with the storage location, the at least two bits indicating a status of contents within the storage location of the hot queue, the method comprising:
   receiving a first input/output (I/O) operation comprising a first location identifier of a first data item within the computer system;
   determining that the first location identifier is stored within the ghost queue of the cache data structure; and
   upon determining that the first location identifier is stored within the ghost queue, (a) mapping the first location identifier to a first mapping data of the first data item, and (b) scanning the ring buffer of the hot queue, and for each storage location of the ring buffer scanned:
      determining a value of the at least two bits of the storage location;
      in response to the value of the at least two bits indicating a cache hit: (a) modifying the value of the at least two bits, and (b) setting a page fault bit to TRUE, wherein the page fault bit is located within a page table entry pointing to a memory page to which the first location identifier resolves, wherein the page table entry is an entry within a page table stored within the computer system; and
      in response to the value of the at least two bits indicating that the storage location is available for addition of new data, choosing the storage location, and adding the first location identifier and the first mapping data to the chosen storage location of the hot queue.

2. The method of claim 1, wherein the scanning of the ring buffer further comprises, for each storage location scanned:
   in response to the value of the at least two bits indicating that a corresponding page fault bit is set to TRUE, wherein the corresponding page fault bit is located within a corresponding page table entry pointing to a corresponding memory page to which a current location identifier of the storage location resolves: (a) changing the value of the at least two bits to indicate that the storage location is available for addition of new data, and (b) unmapping the current location identifier of the storage location from its corresponding mapping data.

3. The method of claim 2, wherein the unmapping comprises:
   locating the corresponding page table entry pointing to the corresponding memory page to which the current location identifier resolves, and clearing or unreserving the corresponding page table entry; and
   clearing at least a portion of a table look aside buffer (TLB) containing the current location identifier.

4. The method of claim 1, further comprising:
   receiving a second I/O operation comprising a second location identifier of a second data item within the computer system;

determining that the second location identifier is stored within the hot queue of the cache data structure;
initiating the second I/O operation;
initiating a page fault and accessing a table look aside buffer (TLB) of the computer system, wherein the TLB stores a mapping between the second location identifier and a second mapping data of the second location identifier;
completing the I/O operation; and
modifying the value of the at least two bits of a storage location within the hot queue storing the second location identifier to indicate that the second data item is stored within the cache of the computer system.

5. The method of claim 1, wherein the cache data structure further comprises a hash table, wherein the hash table includes:
a hash of the first location identifier; and
a pointer to a storage location in at least one of the cold queue, the ghost queue, or the hot queue.

6. The method of claim 1, wherein the first location identifier is a logical block address.

7. The method of claim 1, the computer system further comprising a first process and a second process executing within the computer system, wherein the I/O operation is sent by a second process to the first process, wherein receiving the first I/O operation is performed by the first process.

8. The method of claim 1, wherein the first mapping data is one of a logical block address, a virtual address, a physical address, or a page table entry within a page table.

9. A non-transitory computer readable medium comprising instructions to be executed in a processor of a computer system, the instructions when executed in the processor cause the computer system to carry out a method of managing a cache of a computer system using a cache data structure that includes a cold queue, a ghost queue, and a hot queue, the hot queue configured as a ring buffer that includes a plurality of storage locations, wherein each of the storage locations has at least two bits associated with the storage location, the at least two bits indicating a status of contents within the storage location of the hot queue, the method comprising:
receiving a first input/output (I/O) operation comprising a first location identifier of a first data item within the computer system;
determining that the first location identifier is stored within the ghost queue of the cache data structure;
upon determining that the first location identifier is stored within the ghost queue, (a) mapping the first location identifier to a first mapping data of the first data item, and (b) scanning the ring buffer of the hot queue, and for each storage location of the ring buffer scanned:
determining a value of the at least two bits of the storage location;
in response to the value of the at least two bits indicating a cache hit: (a) modifying the value of the at least two bits, and (b) setting a page fault bit to TRUE, wherein the page fault bit is located within a page table entry pointing to a memory page to which the first location identifier resolves, wherein the page table entry is an entry within a page table stored within the computer system; and
the value of the at least two bits indicating that the storage location is available for addition of new data, choosing the storage location, and adding the first location identifier and the first mapping data to the chosen storage location of the hot queue.

10. The non-transitory computer readable medium of claim 9, wherein the scanning of the ring buffer further comprises, for each storage location scanned:
in response to the value of the at least two bits indicating that a corresponding page fault bit is set to TRUE, wherein the corresponding page fault bit is located within a corresponding page table entry pointing to a corresponding memory page to which a current location identifier of the storage location resolves: (a) changing the value of the at least two bits to indicate that the storage location is available for addition of new data, and (b) unmapping the current location identifier of the storage location from its corresponding mapping data.

11. The non-transitory computer readable medium of claim 10, wherein the unmapping comprises:
locating the corresponding page table entry pointing to the corresponding memory page to which the current location identifier resolves, and clearing or unreserving the corresponding page table entry; and
clearing at least a portion of a table look aside buffer (TLB) containing the current location identifier.

12. The non-transitory computer readable medium of claim 9, the method further comprising:
receiving a second I/O operation comprising a second location identifier of a second data item within the computer system;
determining that the second location identifier is stored within the hot queue of the cache data structure;
initiating the second I/O operation;
initiating a page fault and accessing a table look aside buffer (TLB) of the computer system, wherein the TLB stores a mapping between the second location identifier and a second mapping data of the second location identifier;
completing the I/O operation; and
modifying the value of the at least two bits of a storage location within the hot queue storing the second location identifier to indicate that the second data item is stored within the cache of the computer system.

13. The non-transitory computer readable medium of claim 9, wherein the cache data structure further comprises a hash table, wherein the hash table includes:
a hash of the first location identifier; and
a pointer to a storage location in at least one of the cold queue, the ghost queue, or the hot queue.

14. The non-transitory computer readable medium of claim 9, wherein the first location identifier is a logical block address.

15. The non-transitory computer readable medium of claim 9, the computer system further comprising a first process and a second process executing within the computer system, wherein the I/O operation is sent by a second process to the first process, wherein receiving the first I/O operation is performed by the first process.

16. The non-transitory computer readable medium of claim 9, wherein the first mapping data is one of a logical block address, a virtual address, a physical address, or a page table entry within a page table.

17. A computer system comprising:
a cache;
a cache data structure comprising a cold queue, a ghost, queue, and a hot queue, the hot queue configured as a ring buffer that includes a plurality of storage locations, wherein each of the storage locations has at least two bits associated with the storage location, the at least two bits indicating a status of contents within the storage location of the hot queue; and a processor, wherein the processor is programmed to carry out a method managing the cache of the computer system, the method comprising:
receiving a first input/output (I/O) operation comprising a first location identifier of a first data item within the computer system;
determining that the first location identifier is stored within the ghost queue of the cache data structure;
upon determining that the first location identifier is stored within the ghost queue,(a) mapping the first location identifier to a first mapping data of the first data item, and (b) scanning the ring buffer of the hot queue, and for each storage location of the ring buffer scanned:
determining a value of the at least two bits of the storage location;
in response to the value of the at least two bits indicating a cache hit: (a) modifying the value of the at least two bits, and (b) setting a page fault bit to TRUE, wherein the page fault bit is located within a page table entry pointing to a memory page to which the first location identifier resolves, wherein the page table entry is an entry within a page table stored within the computer system; and
in response to the value of the at least two bits indicating that the storage location is available for addition of new data, choosing the storage location and adding the first location identifier and the first mapping data to the chosen storage location of the hot queue.

18. The method of claim 1, wherein different values of the at least two bits indicate different statuses for a corresponding storage location, the different statuses comprising:
hot cache hit indicating the corresponding storage location is not available;
warm cache hit indicating the corresponding storage location is not available, wherein if the corresponding storage location status is hot cache hit, the corresponding location is accessed more recently than when the storage location status is warm cache hit; and
half unmap indicating that the storage location is available.

* * * * *